(12) United States Patent
Weder (10) Patent No.: US 7,251,913 B2
(45) Date of Patent: *Aug. 7, 2007

(54) METHOD OF COVERING A POTTED PLANT

(75) Inventor: Donald E. Weder, Highland, IL (US)

(73) Assignee: Wanda M Weder and William F. Straeter, Highland, IL (US), not individually but solely as Trustees of The Family Trust U/T/A dated December 8, 1995

( * ) Notice: Subject to any disclaimer, the term of this patent is extended or adjusted under 35 U.S.C. 154(b) by 0 days.

This patent is subject to a terminal disclaimer.

(21) Appl. No.: 11/337,346

(22) Filed: Jan. 23, 2006

(65) Prior Publication Data

US 2006/0117657 A1  Jun. 8, 2006

Related U.S. Application Data

(63) Continuation of application No. 10/666,832, filed on Sep. 17, 2003, now Pat. No. 7,021,000, which is a continuation-in-part of application No. 10/303,994, filed on Nov. 21, 2002, now Pat. No. 6,662,496, which is a continuation of application No. 09/772,712, filed on Jan. 30, 2001, now abandoned, said application No. 10/303,994 and a continuation-in-part of application No. 10/005,304, filed on Oct. 26, 2001, now Pat. No. 6,493,989, is a continuation of application No. 09/687,025, filed on Oct. 13, 2000, now Pat. No. 6,347,481, which is a continuation of application No. 09/366,440, filed on Aug. 3, 1999, now Pat. No. 6,141,906, which is a continuation of application No. 08/851,058, filed on May 5, 1997, now Pat. No. 5,941,020, which is a continuation of application No. 08/237,078, filed on May 3, 1994, now Pat. No. 5,625,979, which is a continuation-in-part of application No. 08/220,852, filed on Mar. 31, 1994, now Pat. No. 5,572,851.

(51) Int. Cl.
  *A01G 9/02* (2006.01)
(52) U.S. Cl. .......................................................... 47/72
(58) Field of Classification Search .................... 47/72; 53/397, 399, 413; 206/423, 457
  See application file for complete search history.

(56) References Cited

U.S. PATENT DOCUMENTS 1,044,260 A  11/1912  Schloss (Continued)

FOREIGN PATENT DOCUMENTS

AU  42 31978  6/1979

(Continued)

*Primary Examiner*—Francis T. Palo
(74) *Attorney, Agent, or Firm*—Dunlap, Codding & Rogers, P.C.

(57) ABSTRACT

A method of covering a flower pot with an oversized sleeve. The sleeve has an inner diameter which is greater than the maximum diameter of a pot disposed therein. The sleeve may have a detachable upper portion, a skirt portion, with a linear or non-linear upper end, or with or without gussets in the lower end or sides. In the method the sleeve is secured about the pot by a crimping a portion of the sleeve having a bonding material thereon, or using a securing element.

25 Claims, 5 Drawing Sheets

U.S. PATENT DOCUMENTS

| | | | |
|---|---|---|---|
| 1,063,154 A | 5/1913 | Bergen | |
| 1,446,563 A | 2/1923 | Hughes | |
| 1,520,647 A | 12/1924 | Hennigan | |
| 1,610,652 A | 12/1926 | Bouchard | |
| 1,697,751 A | 1/1929 | Blake | 229/87 |
| 1,794,212 A | 2/1931 | Snyder | |
| 1,811,574 A | 6/1931 | Barrett | |
| 1,883,108 A | 10/1932 | Thompson | 206/526 |
| 2,200,111 A | 5/1940 | Bensel | 229/1.5 |
| 2,323,287 A | 7/1943 | Amberg | 229/53 |
| 2,355,559 A | 8/1944 | Renner | 229/8 |
| 2,529,060 A | 11/1950 | Trillich | 117/68.5 |
| 2,788,822 A | 4/1957 | Parker | 206/554 |
| 2,850,842 A | 9/1958 | Eubank Jr. | 47/58 |
| 2,989,828 A | 6/1961 | Warp | 53/390 |
| 3,022,605 A | 2/1962 | Reynolds | 47/58 |
| 3,080,680 A | 3/1963 | Reynolds | 47/37 |
| 3,094,810 A | 6/1963 | Kalpin | 47/37 |
| 3,271,922 A | 9/1966 | Wallerstein et al. | 53/3 |
| 3,316,675 A | 5/1967 | Cartwright, Jr. | |
| 3,320,697 A | 5/1967 | Larsen | 47/69 |
| 3,322,325 A | 5/1967 | Bush | 229/62 |
| 3,376,666 A | 4/1968 | Leonard | 47/41 |
| 3,380,646 A | 4/1968 | Doyen et al. | 229/57 |
| 3,431,706 A | 3/1969 | Stuck | 53/390 |
| 3,508,372 A | 4/1970 | Wallerstein et al. | 53/3 |
| 3,512,700 A | 5/1970 | Evans et al. | 229/53 |
| 3,550,318 A | 12/1970 | Remke et al. | 47/37 |
| 3,552,059 A | 1/1971 | Moore | 47/41.12 |
| 3,554,434 A | 1/1971 | Anderson | 229/55 |
| 3,556,389 A | 1/1971 | Gregoire | 229/53 |
| 3,620,366 A | 11/1971 | Parkinson | 206/59 |
| 3,869,828 A | 3/1975 | Matsumoto | 47/34.11 |
| 3,962,503 A | 6/1976 | Crawford | 428/40 |
| 4,043,077 A | 8/1977 | Stonehocker | 47/66 |
| 4,091,925 A | 5/1978 | Griffo et al. | 206/423 |
| 4,118,890 A | 10/1978 | Shore | 47/28 |
| 4,149,339 A | 4/1979 | Hall et al. | 47/67 |
| 4,158,631 A | 6/1979 | Whelan | 210/497 |
| 4,189,868 A | 2/1980 | Tymchuck et al. | 47/84 |
| 4,216,620 A | 8/1980 | Weder et al. | 47/72 |
| 4,248,347 A | 2/1981 | Trimbee | 206/423 |
| D259,333 S | 5/1981 | Charbonneau | D9/306 |
| 4,265,049 A | 5/1981 | Gorewitz | 47/26 |
| 4,280,314 A | 7/1981 | Stuck | 53/241 |
| 4,333,267 A | 6/1982 | Witte | 47/84 |
| 4,347,686 A | 9/1982 | Wood | 47/73 |
| 4,400,910 A | 8/1983 | Koudstall et al. | 47/84 |
| 4,413,725 A | 11/1983 | Bruno et al. | 206/45.33 |
| D279,279 S | 6/1985 | Wagner | D11/143 |
| 4,621,733 A | 11/1986 | Harris | 206/423 |
| 4,640,079 A | 2/1987 | Stuck | 53/390 |
| 4,717,262 A | 1/1988 | Roen et al. | 383/120 |
| 4,733,521 A | 3/1988 | Weder et al. | 53/580 |
| 4,773,182 A | 9/1988 | Weder et al. | 47/72 |
| 4,801,014 A | 1/1989 | Meadows | 206/423 |
| 4,810,109 A | 3/1989 | Castel | 383/105 |
| 4,835,834 A | 6/1989 | Weder | 29/525 |
| D301,991 S | 7/1989 | Van Sant | D11/149 |
| D302,405 S | 7/1989 | Weder | D11/155 |
| 4,941,572 A | 7/1990 | Harris | 206/423 |
| 4,980,209 A | 12/1990 | Hill | 428/34.1 |
| 4,989,396 A | 2/1991 | Weder et al. | 53/397 |
| D315,700 S | 3/1991 | Stephens | D11/151 |
| 5,073,161 A | 12/1991 | Weder et al. | 493/154 |
| 5,074,675 A | 12/1991 | Osgood | 383/122 |
| 5,105,599 A | 4/1992 | Weder | 53/399 |
| 5,111,638 A | 5/1992 | Weder | 53/397 |
| 5,120,382 A | 6/1992 | Weder | 156/212 |
| 5,152,100 A | 10/1992 | Weder et al. | 47/72 |
| 5,181,364 A | 1/1993 | Weder | 53/397 |
| D335,105 S | 4/1993 | Ottenwalder et al. | D11/164 |
| 5,199,242 A | 4/1993 | Weder et al. | 53/397 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,259,106 A | 11/1993 | Weder et al. | 29/469.5 |
| 5,307,606 A | 5/1994 | Weder | 53/410 |
| 5,315,785 A | 5/1994 | Avôt et al. | 47/72 |
| 5,335,475 A | 8/1994 | Weder et al. | 53/397 |
| 5,350,240 A | 9/1994 | Billman et al. | 383/104 |
| 5,353,575 A | 10/1994 | Stepanek | 53/461 |
| 5,361,482 A | 11/1994 | Weder et al. | 29/469 |
| 5,388,695 A | 2/1995 | Gilbert | 206/423 |
| 5,410,856 A | 5/1995 | Weder et al. | 53/397 |
| 5,428,939 A | 7/1995 | Weder et al. | 53/397 |
| 5,443,670 A | 8/1995 | Landau | 156/191 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| D370,186 S | 5/1996 | Barry | D11/149 |
| 5,526,932 A | 6/1996 | Weder | 206/423 |
| 5,551,570 A | 9/1996 | Shaffer et al. | 206/575 |
| 5,572,849 A | 11/1996 | Weder et al. | 53/399 |
| 5,572,851 A | 11/1996 | Weder | 53/399 |
| 5,581,938 A | 12/1996 | Weder | 47/72 |
| 5,595,048 A | 1/1997 | Weder et al. | 53/399 |
| 5,617,703 A | 4/1997 | Weder | 43/413 |
| 5,624,320 A | 4/1997 | Martinez | 472/51 |
| 5,625,979 A | 5/1997 | Weder | |
| 5,647,168 A | 7/1997 | Gilbert | 47/72 |
| 5,647,193 A | 7/1997 | Weder et al. | 53/465 |
| 5,715,944 A | 2/1998 | Windisch | 206/423 |
| 5,845,775 A | 12/1998 | Weder et al. | 206/423 |
| D404,684 S | 1/1999 | Shea | D11/164 |
| 5,974,730 A | 11/1999 | Chien | 47/41.01 |
| 6,000,544 A | 12/1999 | Weder et al. | 206/423 |
| D419,436 S | 1/2000 | Celtorius et al. | D9/305 |
| 6,098,336 A | 8/2000 | Ferguson | 206/423 |
| 6,129,208 A | 10/2000 | Ferguson | 206/423 |
| 6,129,209 A | 10/2000 | Tchira | 206/423 |
| 6,662,496 B2* | 12/2003 | Weder | 47/72 |
| 7,021,000 B2* | 4/2006 | Weder | 47/72 |

FOREIGN PATENT DOCUMENTS

| | | |
|---|---|---|
| BE | 654427 | 1/1965 |
| CH | 560532 | 4/1975 |
| DE | 15550 | 6/1900 |
| DE | 345464 | 12/1921 |
| DE | 513971 | 11/1930 |
| DE | 1131043 | 12/1962 |
| DE | 1166692 | 3/1964 |
| DE | 1962947 | 6/1971 |
| DE | 2060812 | 11/1971 |
| DE | 2748626 | 5/1979 |
| DE | 3445799 | 6/1986 |
| DE | 3601207 | 7/1987 |
| DE | 3829281 | 5/1989 |
| DE | 3911847 | 10/1990 |
| EP | 0050990 | 5/1982 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2489126 | 3/1982 |
| FR | 2610604 | 8/1988 |
| FR | 2603159 | 3/1989 |
| FR | 2619698 | 3/1989 |
| FR | 2651663 | 9/1989 |

| | | | | | | |
|---|---|---|---|---|---|---|
| GB | 5605 | 0/1885 | | JP | 6127555 | 5/1994 |
| GB | 1204647 | 9/1970 | | JP | 8-19334 | 1/1996 |
| GB | 2056410 | 3/1981 | | NL | 8301709 | 12/1984 |
| GB | 2074542 | 11/1981 | | NL | 8702204 | 9/1986 |
| GB | 2128083 | 4/1984 | | NL | 1000658 | 1/1996 |
| GB | 2212136 | 7/1989 | | WO | 9315979 | 8/1993 |
| GB | 2252708 | 8/1992 | | WO | 9712819 | 4/1997 |
| GB | 2203127 | 10/1998 | | | | |
| IT | 224507 | 4/1996 | | | | |
| JP | 542958 | 2/1993 | | | | |

\* cited by examiner

METHOD OF COVERING A POTTED PLANT

CROSS REFERENCE TO RELATED APPLICATIONS

The present application is a continuation of U.S. Ser. No. 10/666,832, filed Sep. 17, 2003, now U.S. Pat. No. 7,021,000, issued Apr. 4, 2006; which is a continuation-in-part of U.S. Ser. No. 10/303,994, filed Nov. 21, 2002, now U.S. Pat. No. 6,662,496, issued Dec. 16, 2003; which is a continuation of U.S. Ser. No. 09/772,712, filed Jan. 30, 2001, now abandoned; said U.S. Ser. No. 10/303,994 is also a continuation-in-part of U.S. Ser. No. 10/005,304, filed Oct. 26, 2001, now U.S. Pat. No. 6,493,989, issued Dec. 17, 2002; which is a continuation of U.S. Ser. No. 09/687,025, filed Oct. 13, 2000, now U.S. Pat. No. 6,347,481, issued Feb. 19, 2002; which is a continuation of U.S. Ser. No. 09/366,440, filed Aug. 3, 1999, now U.S. Pat. No. 6,141,906, issued Nov. 7, 2000; which is a continuation of U.S. Ser. No. 08/851,058, filed May 5, 1997, now U.S. Pat. No. 5,941,020, issued Aug. 24, 1999; which is a continuation of U.S. Ser. No. 08/237,078, filed May 3, 1994, now U.S. Pat. No. 5,625,979, issued May 6, 1997; which is a continuation-in-part of U.S. Ser. No. 08/220,852, filed Mar. 31, 1994, now U.S. Pat. No. 5,572,851, issued Nov. 12, 1996. Each of the above applications is hereby expressly incorporated by reference herein in its entirety.

BACKGROUND

This invention generally relates to sleeves, and, more particularly, to sleeves used to contain floral groupings and media, or used to wrap flower pots containing floral groupings and/or media containing floral groupings, and methods of using the same.

U.S. Pat. Nos. 5,625,979; 5,493,809; 5,829,225; 5,572,851; and U.S. Pat. No. 6,125,578 contain subject matter which may be relevant to the present application. Each of the above-mentioned patents and pending applications is hereby expressly incorporated herein by reference in its entirety.

DESCRIPTION OF THE PREFERRED EMBODIMENTS

The present invention contemplates a method of covering a flower pot with an oversized bag or sleeve and securing it thereabout by crimping a portion of the bag or sleeve with a bonding material or banding element.

It will be appreciated that the examples and embodiments of the invention provided herein are not intended to limit the scope and extent of the claimed invention but are only intended to exemplify various of the embodiments of the invention contemplated herein.

Shown in FIG. 1 and designated therein by the general reference numeral 10 is a tubular, flexible decorative preformed sleeve or bag (hereinafter also referred to as sleeve 10). The sleeve 10 is initially formed in a flattened condition, and is openable in the form of a tube or sleeve which has a closed bottom or a closed bottom having drainage holes or a partially open bottom (not shown). Prior to shipment to the user, or preferably just prior to use by the user, the sleeve 10 may be expanded into an opened configuration as shown in FIG. 2. The sleeve 10 is preferably rectangular in the flattened condition or may be tapered outwardly from the lower end toward a larger diameter at its upper end. Sleeve 10, when rectangular in its flattened state, can be opened to a cylindrical shape or if tapered in its flattened state, is substantially frusto-conical when open (e.g., See FIG. 7, discussed in more detail below). It will be appreciated, however, that the sleeve 10 may comprise variations on the aforementioned shapes or may comprise significantly altered shapes as along as the sleeve functions in accordance with the present invention in the manner described herein.

Figure 1:
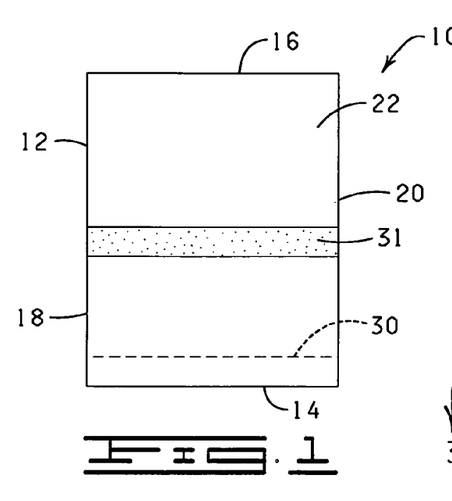
FIG. 1 is an elevational view of a sleeve having a gusset expansion element in a lower end thereof and having a bonding material on an outer surface thereof.
Figure 2:
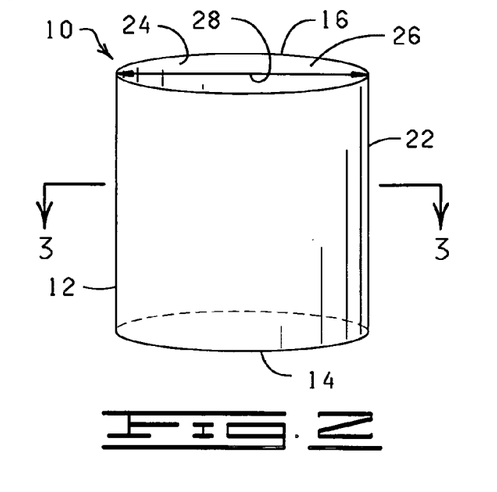
FIG. 2 is a perspective view of the sleeve of FIG. 1 in an opened position.
Figure 3:
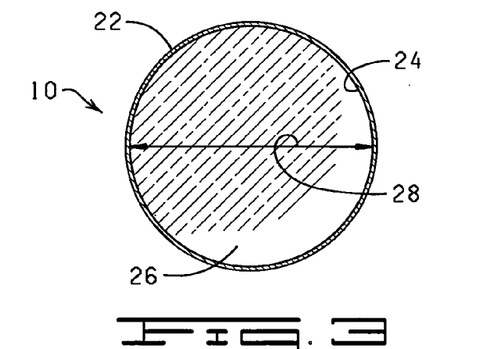
FIG. 3 is a cross-sectional view of the sleeve of FIG. 2 taken along line 3—3.
Figure 5:
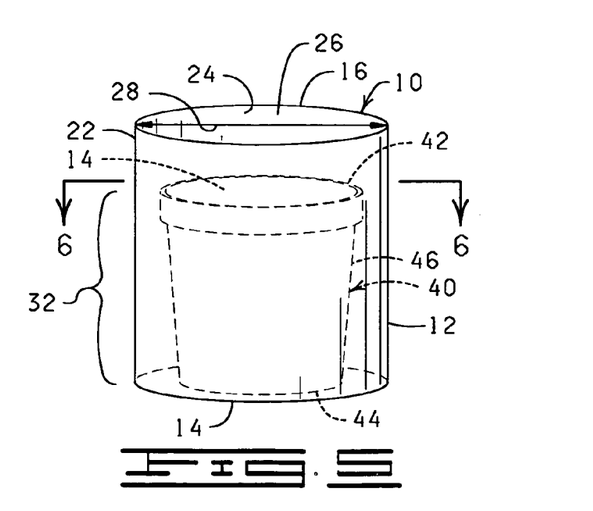
FIG. 5 is a perspective view of the opened sleeve of FIG. 2 with the pot of FIG. 4 disposed therein.

The sleeve 10 in the embodiment of FIGS. 1, 2 and 5 has a body 12 having a lower end 14, an upper end 16, a first side 18 and a second side 20. The sleeve 10 has an outer peripheral surface 22 and an inner peripheral surface 24 which, when the sleeve 10 is opened, defines and encompasses an inner retaining space 26 as indicated in FIGS. 2, 3, 5 and 6. In the opened condition, the sleeve 10 has an inner diameter 28 measured across a portion of the inner space 26 and a gusset 30 (FIG. 1) in the lower end 14 which is unfolded when the sleeve 10 is opened. The inner diameter 28 is preferably a maximum diameter of the sleeve 10. The gusset 30 is constructed in a manner well known to one of ordinary skill in the art for permitting a bottom of an object such as a pot 40 to be disposed into the inner retaining space 26 of the sleeve 10, therefore further description of the formation of gussets is not deemed necessary herein.

Sleeve 10 of FIG. 1 further comprises a bonding material 31 disposed on at least a portion of the outer peripheral surface 22 for forming connected overlapping folds in a crimped portion thereof (as described in more detail below). In an alternate embodiment, the bonding material 31 may be disposed on a portion of the inner peripheral surface 24 of the sleeve 10. Further, the sleeve 10 in an alternate embodiment may be constructed without the gusset 30 in its lower end 14. In another embodiment, the gusset 30 may be constructed in a different configuration from that shown herein, for example as shown in U.S. Ser. No. 09/401,771, the entire specification of which is hereby expressly incorporated by reference.

Figure 4:
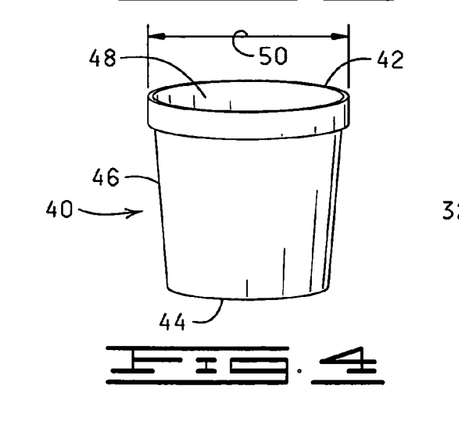
FIG. 4 is a perspective view of a flower pot.
Figure 6:
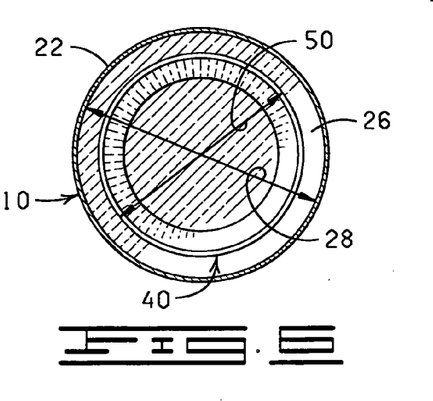
FIG. 6 is a cross-sectional view of the opened sleeve conforming the pot of FIG. 5 taken along line 6—6.

The sleeves described herein are constructed to contain a flower pot such as pot 40 shown in FIGS. 4, 5 and 6). Pot 40 has an upper end 42, a lower end 44, and outer peripheral surface 46, an inner retaining space 48, and a maximum diameter 50 which extends across the widest portion of the pot 40 which is typically the upper end 42. Shown in FIG. 5 is an opened sleeve 10 which contains the pot 40. The pot 40 is contained within a pot containing portion 32, (also referred to herein as a base portion) of the sleeve 10. As shown in FIG. 6, the maximum diameter 50 of the pot 40 is less than the inner diameter 28 of the sleeve 10. Preferably, the inner diameter 28 of the sleeve 10 is at least 5% to 10% greater than the maximum diameter 50 of the pot 40. The inner diameter 28 may also be significantly more than 10% greater than the maximum diameter 50 of the pot 40. For example, the inner diameter 28 may be 20%, 30%, 40%, or more, greater than the maximum diameter 50. The inner diameter 28 is preferably measured across the inner retaining space 26 at the upper end 16 of the sleeve 10 or may be measured at other positions across the inner retaining space 26 to opposing points on the inner peripheral surface 24.

Further, the sleeve 10 may comprise any shape, whether geometric, non-geometric, asymmetrical and/or fanciful as long as it functions in accordance with the present invention. The sleeve 10 may also be equipped with a drainage hole (e.g., one or more holes) or ventilation holes (not shown) or can be made from permeable or impermeable materials. Preferably the sleeve 10 is sized to contain and conform to one of a variety of standard sizes of pots known to those of ordinary skill in the art, such as 4 inch, 5 inch, 6 inch, 7 inch, and 8 inch pots or pots that are larger than, smaller than, or intermediate between such pot sizes.

Figure 7:
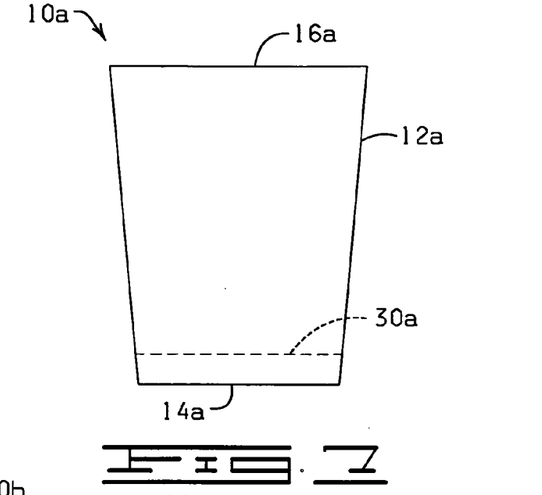
FIG. 7 is an elevational view of another sleeve constructed in accordance with the present invention.

Shown in FIG. 7 is a sleeve 10a, having a body 12a, a lower end 14a, an upper end 16a, and a gusset 30a. Sleeve 10a is similar to sleeve 10 except sleeve 10a has a tapered shape and although not shown as having a bonding material thereon may alternately have a bonding material disposed upon a portion thereof. Sleeve 10a may be constructed without a gusset 30a.

Figure 8:
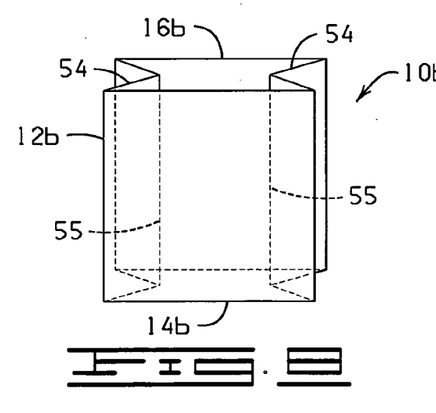
FIG. 8 is a perspective view of a sleeve having side gussets.
Figure 9:
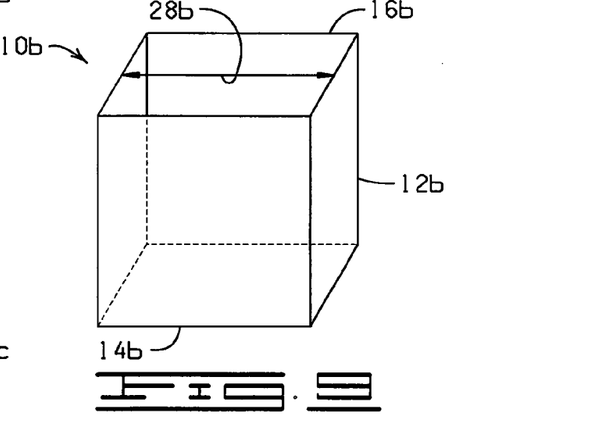
FIG. 9 is a perspective view of the sleeve of FIG. 8 in an opened position.

The sleeve contemplated herein may have more than one side and/or bottom gusset, for example as shown in FIGS. 8 and 9. Sleeve 10b has a body 12b, a lower end 14b, an upper end 16b and a pair of side gussets 54 (FIG. 8). When opened, as shown in FIG. 9, the sleeve 10b has a rectangular shape or is rectangular in cross-section and has an inner diameter 28b which is that distance across the closest points on opposite sides of the sleeve 10b when the sleeve 10b is in the fully opened condition. The present invention further contemplates sleeve embodiments comprising a plurality of gussets in each side of the sleeve and/or in the bottom of the sleeve.

For example, any sleeve described herein may be constructed in a manner similar to that shown in sleeve 10b in FIG. 8 to have two side gussets 54, each having an inner fold 55.

Figure 10:
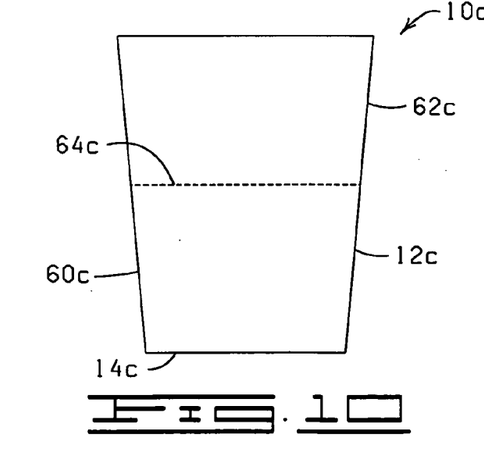
FIG. 10 is an elevational view of another sleeve constructed in accordance with the present invention.

The invention further contemplates a sleeve such as sleeve 10c shown in FIG. 10 which has a detachable upper portion. Sleeve 10c is constructed in a manner similar to any of the other sleeves described herein except sleeve 10c comprises a lower portion 60c and an upper portion 62c. Sleeve 10c may be constructed with or without a gusset in a lower end 14c thereof. The upper portion 62c is detachable from the lower portion 60c via a detaching element 64c such as a line of perforations. The term "detaching element," as used generally herein, means any element, or combination of elements, or features, including but not limited to, perforations, tear strips, weakened areas, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith. Preferably, the upper portion 62c is sized to substantially enclose a floral grouping, and the lower portion 60c is sized to contain and enclose a pot.

Figure 11:
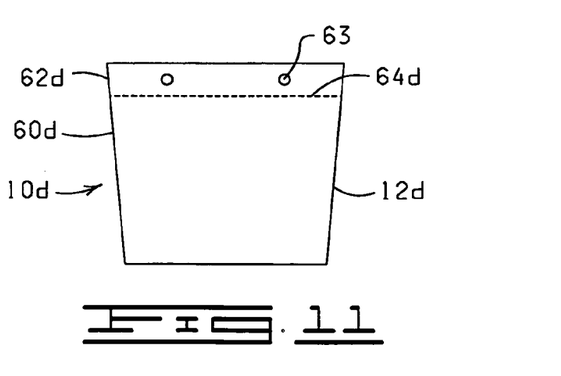
FIG. 11 is an elevational view of another sleeve constructed in accordance with the present invention.

In another embodiment, shown in FIG. 11, a sleeve 10d, comprises an upper portion 62d having apertures 63 therein. The upper portion 62d extends from a lower portion 60d for allowing the sleeve 10d to be supported on a support assembly such as a wicket or staple and which is commercially available and known by one of ordinary skill in the art for shipment, storage, assembly of the sleeve 10d, placement of a pot within the sleeve 10d, or other functions known in the art. The sleeve 10d has a detaching element 64d such as described elsewhere herein, but which preferably comprises a plurality of perforations, for allowing the upper portion 62d to be removed from the lower portion 60d after the sleeve 10d has been provided for use as described elsewhere herein. In this embodiment, the upper portion 62d is not sized to substantially enclose a floral grouping, but it is also contemplated that a sleeve such as sleeve 10c may have apertures in the upper portion 62c for enabling the sleeve 10c to be supported from a support assembly. In another version (not shown) of the invention, a sleeve has an extended portion comprising a handle for carrying a potted plant package by the sleeve. Such a sleeve may further comprise a detaching element such as perforations for removing the handle at a later time.

Figure 12:
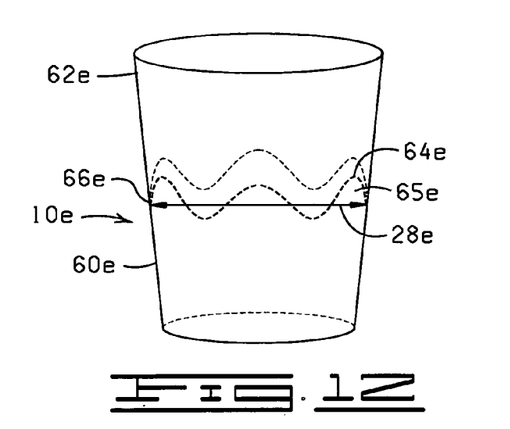
FIG. 12 is a perspective view of another sleeve constructed in accordance with the present invention.

FIG. 12 shows a sleeve 10e similar to sleeve 10c except sleeve 10e comprises a lower portion 60e, comprising a body 12e and a decorative skirt portion 65e, and an upper portion 62e which is detachable from the lower portion 60e via a detaching element 64e such as perforations having a non-linear or curved pattern. The sleeve 10e has an inner diameter 28e. When the upper portion 62e is detached, the decorative skirt portion 65e is left extending in the lower portion 60e. The non-linear pattern may be modified to result in any of the patterns described for FIGS. 25A–25F of U.S. Ser. No. 09/064,460 as noted above. The skirt portion 65e has a lower end 66e which comprises a lower most portion of the curves (or non-linear portions) of the decorative skirt portion 65e. Preferably the inner diameter 28e is measured across the lower end 66e of the skirt portion 65e.

As noted elsewhere herein, the configurations of the gussets or gusset folds shown herein are not the only configurations contemplated for the present invention. Any gusset or gusset fold which functions in accordance with the present invention may be used.

Figure 13:
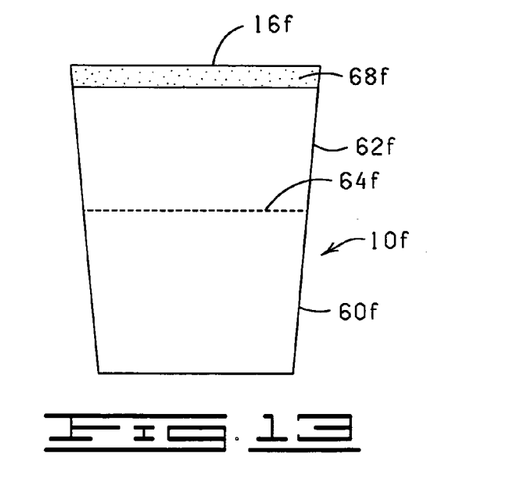
FIG. 13 is an elevational view of another sleeve constructed in accordance with the present invention.

FIG. 13 shows a sleeve 10f which has a strip of bonding material 68f disposed adjacent an upper end 16f of an upper portion 62f of sleeve 10f for allowing the upper end 16f to be sealed or closed for enclosing the upper portion 62f of the sleeve 10f about a floral grouping disposed therein. Sleeve 10f has a lower portion 60f which is detachable from upper portion 62f via detaching element 64f.

Although not shown herein, any of the sleeves 10–10f described herein may be used as a container for a growing medium and a floral grouping wherein the floral grouping is disposed within the growing medium without using a pot. In a preferred version, at least a portion of the sleeve 10–10f is constructed of a material resistant or impermeable to leakage, while the detachable upper portion, if present, is preferably constructed of a thinner transparent or translucent material.

Shown in FIGS. 14–17 are examples of how the sleeves 10–10f described herein can be secured about the pot 40 and floral grouping 69. FIGS. 14–17 demonstrate the use of sleeve 10 having body 12, lower end 14, and upper end 16, but it will be understood that any of sleeves 10a–10f, or other sleeves not shown herein but constructed in a similar manner, can be applied about the pot 40 in a similar manner.

Figure 14:
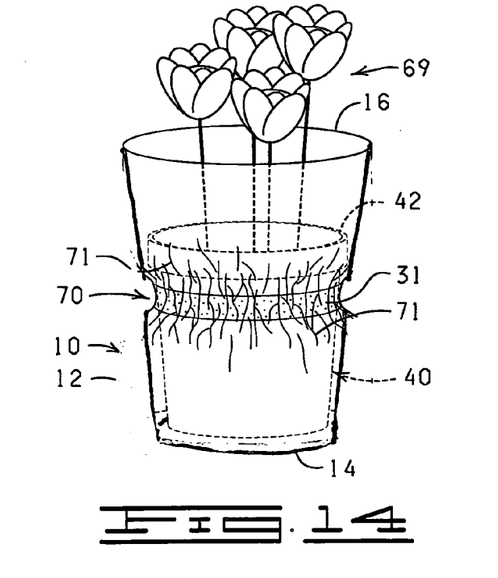
FIG. 14 is a perspective view of the sleeve of FIG. 1 containing a potted plant, the sleeve crimped at a position below an upper end of the pot.
Figure 15:
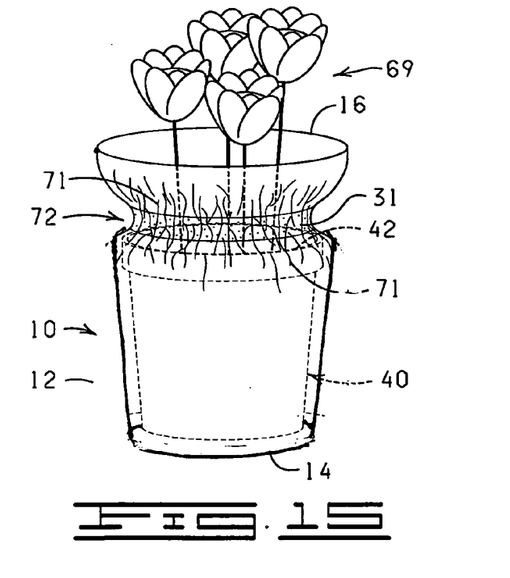
FIG. 15 is a perspective view of the sleeve of FIG. 1 containing a potted plan, the sleeve crimped at a position above the upper end of the pot.

FIG. 14 shows sleeve 10 opened and containing pot 40. The sleeve 10 has been crimped in a portion having the bonding material 31 thereon in a position below the upper end 42 of the pot 40 thereby forming a crimped portion 70 having connected overlapping folds 71 in a position below upper end 42 of the pot 40. The crimped portion 70 serves to secure the sleeve 10 in a position about the pot 40 because, as noted above, the inner diameter 28 of the sleeve 10 is at least 5% or 10% greater than the maximum diameter 50 of the pot 40. FIG. 15 shows sleeve 10 crimped about pot 40 in much the same way as FIG. 14, but in FIG. 15, a crimped portion 72 has been formed in the sleeve 10 in a position above the upper end 42 of pot 40 and also has connected overlapping folds 71.

Figure 16:
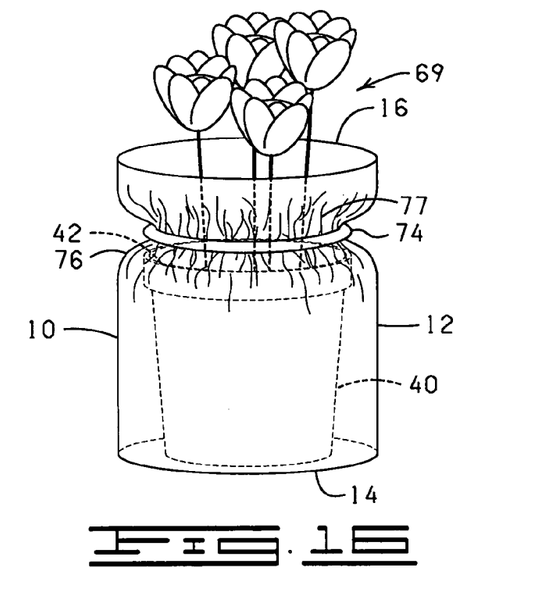
FIG. 16 is a perspective view of a sleeve constructed in accordance with the present invention and containing a potted plant with the sleeve secured by a banding element disposed above the upper end of the pot.
Figure 17:
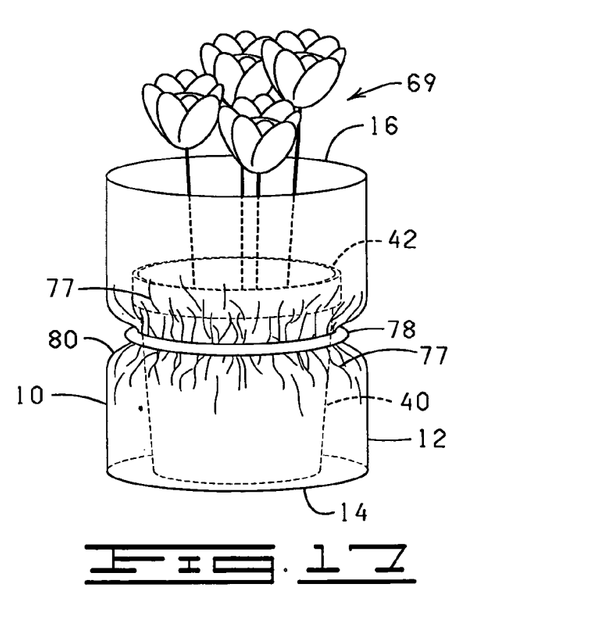
FIG. 17 is a perspective view of a sleeve constructed in accordance with the present invention and containing a potted plant with the sleeve secured by a banding element disposed below the upper end of the pot.

In an alternative embodiment, the sleeve 10 may be secured about the pot 40 using a securing element 74 such as a banding element to form a crimped portion 76, comprising overlapping folds 77, in a position above the upper end 42 of the pot 40 as shown in FIG. 16. Alternatively, as shown in FIG. 17, the sleeve 10 can be secured about the pot 40 using a securing element 78 to form a overlapping folds 77 in a crimped portion 80 in the sleeve 10 in a position below the upper end 42 of the pot 40.

The material from which the sleeves 10–10f contemplated herein are constructed preferably has a thickness in a range from about 0.1 mil to about 30 mil. Often, the thickness of the sleeve 10–10f is in a range from about 0.5 mil to about 10 mil. Preferably, the sleeve 10–10f has a thickness in a range from about 1.0 mil to about 5 mil. The sleeve 10–10f is constructed from a material which is flexible, semi-rigid, rigid, or any combination thereof as long as the sleeve 10–10f can be crimped in a manner shown herein. The sleeve 10–10f may be constructed of a single layer of material or a plurality of layers of the same or different types of materials. Any thickness of the material may be utilized as long as the material functions in accordance with the present invention and is expandable to an open position as described herein. The layers of material comprising the sleeve 10–10f may be connected together or laminated or may be separate layers. Such materials used to construct the sleeve 10–10f are described in U.S. Pat. No. 5,111,638 issued to Weder et al., on May 12, 1992, which is hereby expressly incorporated herein by reference. Any thickness of material may be utilized in accordance with the present invention as long as the sleeve 10–10f may be formed as described herein, and as long as the formed sleeve 10–10f may contain at least a portion of a pot or potted plant or a floral grouping, as described herein. Additionally, an insulating material such as bubble film (not shown), preferable as one of two or more layers, can be utilized in order to provide additional protection for the item, such as a floral grouping, contained therein.

In one embodiment, the sleeve 10–10f may be constructed from a material comprising two polypropylene films. The polypropylene film comprising the sleeve 10–10f may be connected together or laminated or may be separate layers. In an alternative embodiment, the sleeve 10–10f may be constructed from only of the polypropylene films.

The sleeve 10–10f is constructed from any suitable material that is capable of being formed into a sleeve and wrapped about a pot having a floral grouping disposed therein. Preferably, the material comprises paper (untreated or treated in any manner), metal foil, polymeric film, non-polymeric film, fabric (woven or nonwoven or synthetic or natural), cardboard, fiber, cloth, burlap, or laminations or combinations thereof.

The term "polymeric film" means a synthetic polymer such as a polypropylene or a naturally occurring polymer such as cellophane. A polymeric film is relatively strong and not as subject to tearing (substantially non-tearable), as might be the case with paper or foil.

The material used to construct the sleeve 10–10f may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink on Foil And/Or Synthetic Organic Polymer" issued to Kingman on Sep. 15, 1992, and which is hereby expressly incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to any surface of the sleeve 10–10f. Moreover, portions of the material used in constructing the sleeve 10–10f may vary in the combination of such characteristics. The material utilized for the sleeve itself may be opaque, translucent, transparent, or partially clear or tinted transparent.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic material such as soil, humus, perlite, vermiculite, sand, water, and including the nutrients, fertilizers, or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms cones, or roots, taken singly or in combination, or in groupings of such portions such as bouquets or floral groupings.

The term "propagule" when used herein means any structure capable of being propagated or acting as an agent of reproduction including seeds, shoots, stems, runners, tubers, plants, leaves, roots or spores.

The upper ends or detaching elements of the sleeves 10–10f contemplated herein may have a variety of patterns. For example, the upper end 16 of the sleeve 10 or any sleeve described herein may be modified to have a skirt portion which has a wavy, sinusoidal, scalloped, crenulate, crenelate, zig-zagged, or toothed, or other regular or irregular pattern. Examples of such patterns are shown in FIGS. 25A–25F of U.S. Ser. No. 09/064,460 and are hereby expressly incorporated herein by reference.

As noted above in the present invention, a bonding material 31 may be disposed on a portion of the sleeve 10–10f in certain embodiments of the sleeve 10–10f, to assist in holding the sleeve 10–10f about the pot 40 having the floral grouping therein (e.g., see sleeve 10 of FIGS. 1, 14 and 15) when such a pot 40 is disposed within the sleeve 10 or to assist in closing or sealing the upper portion (e.g., see sleeve 10f of FIG. 13) or in adhering the sleeve 10–10f to the pot 40 after the pot 40 has been disposed therein for example in the manner shown in U.S. Pat. No. 5,493,809 which is hereby expressly incorporated by reference herein in its entirety.

It will be understood that the bonding material 31 may be disposed as a strip or block on a surface of the sleeve 10–10f. The bonding material 31 may also be disposed upon either an outer peripheral surface or an inner peripheral surface of the sleeve 10–10f, as well as upon the pot 40. Further, the bonding material 31 may be disposed as spots of bonding material, or in any other geometric, non-geometric, asymmetric, or fanciful form, and in any pattern including covering either the entire inner peripheral surface and/or outer peripheral surface of the sleeve 10–10f and/or the pot 40. The bonding material 31 may be covered by a release strip which can be removed prior to the use of the sleeve. The bonding material 31 can be applied by mechanism or method known to those of ordinary skill in the their art. One method for disposing a bonding material 31, in this case an adhesive, is described in U.S. Pat. No. 5,111,637 entitled "Method For Wrapping A Floral Grouping" issued to Weder et al., on May 12, 1992, which is hereby expressly incorporated herein by reference.

The term "bonding material" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. A cold seal adhesive binds quickly and easily with minimal pressure, and such a seal is not readily releaseable. This characteristic is different from, for example, a pressure sensitive adhesive.

The term "securing element" when used herein may also include ties, wires, labels, bands, ribbons, strings, collars, tapes (including single or double-sided adhesive tapes), staples, or springs, or combinations thereof. Some of the securing elements may bind the circumference of the sleeve 10–10f; or, alternatively and/or in addition, the securing element would secure overlapping folds in the sleeve 10–10f.

It will be understood by a person of ordinary skill in the art that equipment and devices for forming floral sleeves such as sleeves 10–10f are commercially available, and are well known to a person of ordinary skill in the art. Therefore, further discussion of the construction of the sleeves 10–10f described herein is not deemed necessary.

In another version of the present invention, a sleeve (not shown) may comprise a flap positioned at an upper end which can be folded over and sealed with a flap bonding strip to an adjacent portion of the outer peripheral surface of the sleeve near the upper end thereof. Other versions of the sleeve (not shown) may comprise ventilation holes or drainage holes (e.g., holes in the lower end 14) for allowing movement of gases or moisture to and away from the inner space of the sleeve.

Other versions of the present invention may comprise additional perforated areas for enhancing angularity of the extension of a skirt portion away from a base portion after an upper portion of the sleeve has been detached. Examples of such sleeves described above herein comprising these additional features are shown in FIGS. 6–8 and 14–20 of U.S. Pat. No. 5,625,979 and the corresponding descriptions therein, which are specifically hereby expressly incorporated herein by reference.

The sleeve 10–10f or any sleeve described herein may comprise a portion of a plant package such as shown in FIGS. 14–17 which additionally comprises a pot disposed within the sleeve 10, the pot having a floral grouping disposed therein, and wherein the pot is substantially surrounded and encompassed by the pot containing portion of the sleeve. Alternatively, the plant package may comprise only the sleeve, a plant or botanical item, and a growing medium for containing the plant, for example for the purpose of cultivating the plant, floral grouping 69, or botanical item.

The term "pot" 40 as used herein refers to any type of container used for holding a floral grouping 69 or plant. Examples of pots 40, used in accordance with the present invention include, but not by way of limitation, clay pots, wooden pots, plastic pots, foam pots, pots made from natural and/or synthetic fibers, or any combination thereof. The pot 40 is adapted to receive a floral grouping 69, as previously described, in the retaining space. The floral grouping 69 may be disposed within the pot 40 along with a suitable growing medium described elsewhere herein, or other retaining medium, such as a floral foam. It will also be understood that the floral grouping 69, and any appropriate growing medium or other retaining medium, may be disposed in the sleeve without a pot 40 as noted above.

The sleeves 10–10f described herein may be formed by advancing two separate webs, one or two webs preformed in the form of a tube, or a single web folded double and sealing the longitudinal sides and bottom of the two facing panels then cutting the sleeve 10–10f thus formed from the webs or web. Machines which can form sleeves 10–10f from such single webs or pairs of webs are well within the knowledge of one of ordinary skill in the art.

It should also be noted that for all versions of sleeves 10–10f described, it may be desirable to have a release material or cover strip covering the adhesive or cohesive bonding material when such a bonding material is disposed on any portion of the sleeve 10–10f for preventing the bonding material from bonding to another surface until desired. Further in each of the cases described herein wherein a sleeve 10–10f is applied to a pot, the sleeve 10–10f may be applied thereto either by depositing the pot downwardly into the open retaining space of the sleeve 10–10f, or the sleeve 10–10f may be brought upwardly about the pot from below the pot.

It should be further noted that various features of the versions of the present invention such as closure bonding areas, support extension, handles, additional perforations, drainage holes, ventilation holes, combinations of material may be used alone or in combination as elements of any of the embodiments described above herein.

Changes may be made in the construction and the operation of the various components, elements and assemblies described herein or in the steps or the sequence of steps of the methods described herein without departing from the spirit and scope of the invention as defined in the following claims.

What is claimed is:

1. A method of covering a pot, comprising:
   providing a pot having an upper end, a lower end, an outer peripheral surface, an inner retaining space, and a maximum diameter;
   providing a decorative preformed sleeve initially having a flattened condition and comprising a body having a tapered shape and having an upper end, a lower end, an outer peripheral surface, an inner peripheral surface, an inner diameter, and having a pot containing portion, the decorative preformed sleeve having a securing element disposed on at least a portion of at least one of the inner peripheral surface and the outer peripheral surface thereof, and wherein the inner diameter of the decorative preformed sleeve exceeds the maximum diameter of the pot by at least about 10 percent;
   disposing the pot within the pot containing portion of the decorative preformed sleeve wherein the upper end of the decorative preformed sleeve is positioned adjacent a lower portion of a floral grouping disposed within the pot such that the floral grouping is not enclosed by the sleeve; and
   securing the decorative preformed sleeve about the pot via the securing element.

2. The method of claim 1 wherein, in the step of providing the decorative preformed sleeve, an upper portion of the decorative preformed sleeve is adapted to support the body of the decorative preformed sleeve from a support assembly.

3. The method of claim 1 wherein, in the step of providing the decorative preformed sleeve, the decorative preformed sleeve comprises a decorative skirt portion extending from the body.

4. The method of claim 3 wherein the inner diameter is measured at a lower end of the decorative skirt portion.

5. The method of claim 1 wherein, in the step of providing the decorative preformed sleeve, the body of the decorative preformed sleeve further comprises a gusset in a lower portion thereof.

6. The method of claim 1 wherein, in the step of providing the decorative preformed sleeve, the decorative preformed sleeve further comprises a side gusset in the body.

7. The method of claim 1 wherein, in the step of providing the decorative preformed sleeve, an upper portion of the decorative preformed sleeve comprises a bonding material disposed thereon.

8. The method of claim 1 wherein, in the step of securing the decorative preformed sleeve about the pot via the securing element, the securing element is selected from the group consisting of ties, strings, wires, ribbons, rubber bands, collars, rings, staples, tapes, and combinations thereof.

9. The method of claim 1 wherein, in the step of securing the decorative preformed sleeve about the pot via the securing element, the securing element is applied to the decorative preformed sleeve at a position above the upper end of the pot.

10. The method of claim 1 wherein, in the step of securing the decorative preformed sleeve about the pot via the securing element, the securing element is applied to the decorative preformed sleeve at a position below the upper end of the pot.

11. The method of claim 1 wherein, in the step of securing the decorative preformend sleeve about the pot via the securing element, the securing element is pre-attached to the decorative preformed sleeve before the pot is disposed within the decorative preformed sleeve.

12. The method of claim 1 wherein the inner diameter of the decorative preformed sleeve is measured at the upper end of the body.

13. A plant package comprising a pot having a floral grouping disposed therein, the pot covered by a decorative preformed sleeve, the plant package produced by the method of claim 1.

14. A method of covering a pot, comprising:
   providing a pot having an upper end, a lower end, an outer peripheral surface, an inner retaining space, and a maximum diameter;
   providing a decorative preformed sleeve initially having a flattened condition and comprising a body having a tapered shape and having an upper end, a closed, non-gusseted lower end, an outer peripheral surface, an inner peripheral surface, an inner diameter, and having a pot containing portion, the decorative preformed sleeve having a securing element disposed on at least a portion of at least one of the inner peripheral surface and the outer peripheral surface thereof, and wherein the inner diameter exceeds the maximum diameter of the pot by at least about 10 percent;

disposing the pot within the pot containing portion of the decorative preformed sleeve wherein the upper end of the decorative preformed sleeve is positioned adjacent a lower portion of a floral grouping disposed within the pot such that the floral grouping is not enclosed by the sleeve; and securing the decorative preformed sleeve about the pot via the securing element.

15. The method of claim 14 wherein, in the step of providing the decorative preformed sleeve, an upper portion of the decorative preformed sleeve is adapted to support the body of the decorative preformed sleeve from a support assembly.

16. The method of claim 14 wherein, in the step of providing the decorative preformed sleeve, the decorative preformed sleeve comprises a decorative skirt portion extending from the body.

17. The method of claim 16 wherein the inner diameter is measured at a lower end of the decorative skirt portion.

18. The method of claim 14 wherein, in the step of providing the decorative preformed sleeve, the decorative preformed sleeve further comprises a side gusset in the body.

19. The method of claim 14 wherein, in the step of providing the decorative preformed sleeve, an upper portion of the decorative preformed sleeve comprises a bonding material disposed thereon.

20. The method of claim 14 wherein, in the step of securing the decorative preformed sleeve about the pot via the securing element, the securing element is selected from the group consisting of ties, strings, wires, ribbons, rubber bands, collars, rings, staples, tapes and combinations thereof.

21. The method of claim 14 wherein, in the step of securing the decorative preformed sleeve about the pot via the securing element, the securing element is applied to the decorative preformed sleeve at a position above the upper end of the pot.

22. The method of claim 14 wherein, in the step of securing the decorative preformed sleeve about the pot via the securing element, the securing element is applied to the decorative preformed sleeve at a position below the upper end of the pot.

23. The method of claim 14 wherein, in the step of securing the decorative preformed sleeve about the pot via the securing element, the securing element is pre-attached to the decorative preformed sleeve before the pot is disposed within the decorative preformed sleeve.

24. The method of claim 14 wherein the inner diameter of the decorative preformed sleeve is measured at the upper end of the body.

25. A plant package comprising a pot having a floral grouping disposed therein, the pot covered by a decorative preformed sleeve, the plant package produced by the method of claim 14.

* * * * *

UNITED STATES PATENT AND TRADEMARK OFFICE
CERTIFICATE OF CORRECTION

| | |
|---|---|
| PATENT NO. | : 7,251,913 B2 |
| APPLICATION NO. | : 11/337346 |
| DATED | : August 7, 2007 |
| INVENTOR(S) | : Donald E. Weder |

Figure 18:
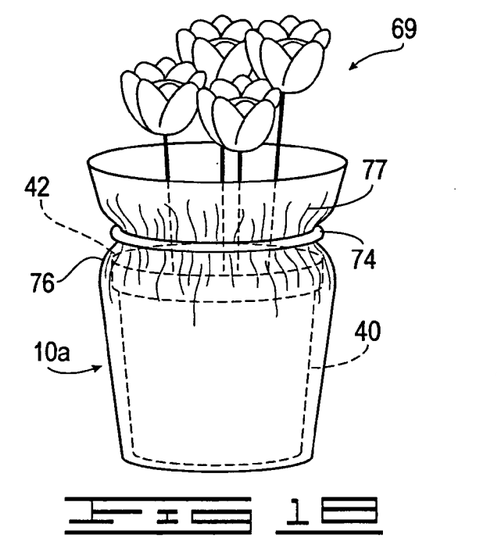
FIG. 18 is a perspective view of a sleeve constructed in accordance with the present invention and containing a potted plant with the sleeve secured by a banding element disposed above the upper end of the pot.
Figure 19:
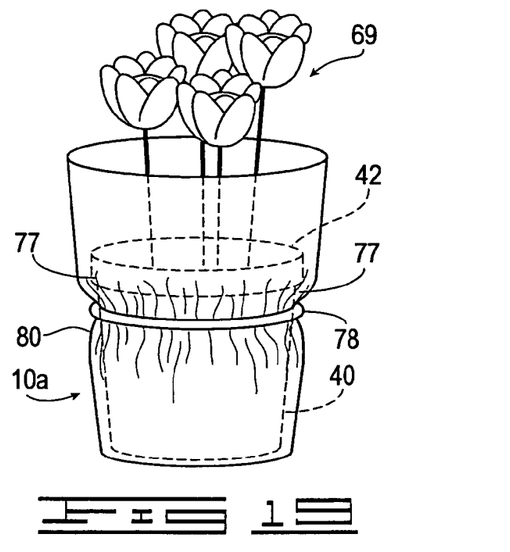
FIG. 19 is a perspective view of a sleeve constructed in accordance with the present invention and containing a potted plant with the sleeve secured by a banding element disposed below the upper end of the pot.

It is certified that error appears in the above-identified patent and that said Letters Patent is hereby corrected as shown below:

Column 5, line 60: Insert the following two paragraphs after line 60,
-- In an alternative embodiment, the sleeve 10a may be secured about the pot 40 using a securing element 74 to form a crimped portion 76, comprising overlapping folds 77, in a position above the upper end 42 of the pot 40 as shown in Fig. 18. Alternatively, as shown in Fig. 19, the sleeve 10a can be secured about the pot 40 using a securing element 78 to form overlapping folds 77 in a crimped portion 80 in the sleeve 10a in a position below the upper end 42 of the pot 40.

Figure 20:
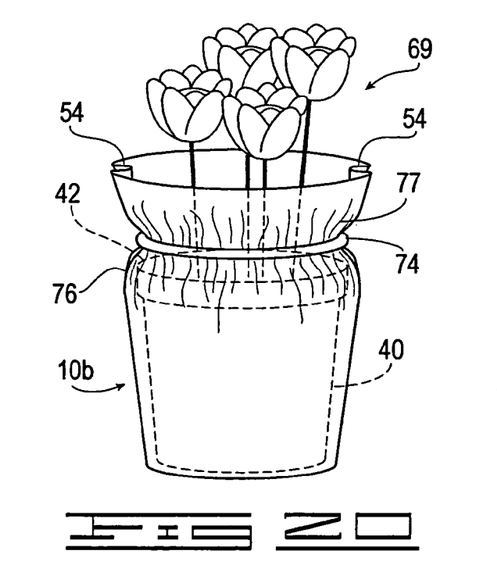
FIG. 20 is a perspective view of a sleeve constructed in accordance with the present invention and containing a potted plant with the sleeve secured by a banding element disposed above the upper end of the pot.
Figure 21:
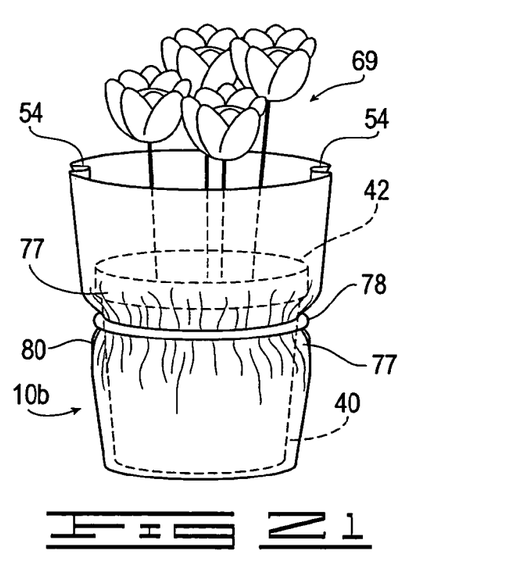
FIG. 21 is a perspective view of a sleeve constructed in accordance with the present invention and containing a potted plant with the sleeve secured by a banding element disposed below the upper end of the pot.

In an alternative embodiment, the sleeve 10b may be secured about the pot 40 using a securing element 74 to form a crimped portion 76, comprising overlapping folds 77, in a position above the upper end 42 of the pot 40 as shown in Fig. 20. Alternatively, as shown in Fig. 21, the sleeve 10b can be secured about the pot 40 using a securing element 78 to form overlapping folds 77 in a crimped portion 80 in the sleeve 10b in a position below the upper end 42 of the pot 40. --

Signed and Sealed this

Twenty-third Day of October, 2007

JON W. DUDAS
*Director of the United States Patent and Trademark Office*